United States Patent [19]

Olson et al.

[11] Patent Number: 4,819,692

[45] Date of Patent: Apr. 11, 1989

[54] STRAIGHT CONNECTING HYDRAULIC QUICK COUPLER

[75] Inventors: Rohn L. Olson, North Richland Hills; Jose G. Caero, Fort Worth, both of Tex.

[73] Assignee: Bell Helicopter Textron Inc., Fort Worth, Tex.

[21] Appl. No.: 49,395

[22] Filed: Apr. 29, 1987

[30] Foreign Application Priority Data

Apr. 29, 1987 [WO] PCT Int'l Appl. .................. PCT/US87/00935

[51] Int. Cl.[4] .............................................. F16L 37/28
[52] U.S. Cl. ............................ 137/614.03; 137/614.06
[58] Field of Search .............. 137/614, 614.03, 614.04, 137/614.06

[56] References Cited

U.S. PATENT DOCUMENTS

| | | | |
|---|---|---|---|
| Re. 23,586 | 11/1952 | Merriman | 151/39 |
| 1,626,729 | 5/1927 | Handlan, Jr. | |
| 2,254,997 | 9/1941 | Fisher | 284/19 |
| 2,436,206 | 2/1948 | Dening | 137/614.03 |
| 2,451,218 | 10/1948 | Hengst | 284/19 |
| 2,451,441 | 10/1948 | Main, Jr. | 284/18 |
| 2,489,919 | 11/1949 | Merriman | 151/39 |
| 2,491,406 | 12/1949 | Zeeb | 285/120 |
| 2,505,093 | 4/1950 | Brock | 284/19 |
| 2,709,093 | 5/1955 | Zeeb | 285/120 |
| 2,731,058 | 1/1956 | Smisko | 151/39 |
| 2,828,978 | 4/1958 | Wurzburger | 285/85 |
| 2,898,963 | 8/1959 | Courtot | 151/10 |
| 2,934,359 | 4/1960 | Smisko et al. | 284/19 |
| 3,079,178 | 2/1963 | Simpkins | 285/83 |
| 3,205,911 | 9/1965 | Swick, Jr. | 137/614.03 |
| 3,285,283 | 11/1966 | Calvin | 137/614.03 |
| 3,359,015 | 12/1967 | Zahuranec | 285/89 |
| 3,706,318 | 12/1972 | Baniadam et al. | 137/614.03 |
| 4,269,389 | 5/1981 | Ekman | 251/149.6 |
| 4,543,993 | 10/1985 | Calvin et al. | 137/614.03 |

*Primary Examiner*—A. Michael Chambers
*Assistant Examiner*—John C. Fox
*Attorney, Agent, or Firm*—Richards, Harris, Medlock & Andrews

[57] ABSTRACT

A quick connect/disconnect hydraulic coupler is provided especially for connecting rigid hydraulic members where no axial movement of the coupling halves can be achieved. The quick coupler comprises a male connector attached to one hydraulic line and a female connector attached to another hydraulic line. The male and female connectors each include an annular check valve that is spring-biased against a poppet seat to prevent loss of hydraulic fluid when the coupler halves are disconnected. The male connector has an annular coupling nut surrounding and confining the male check valve. When the male and female connector halves are aligned, the coupling nut can be moved axially toward the female connector and rotated to engage threads on the outside circumference of the female connector. Tightening the coupling nut onto the female connector forces the male check valve to extend and to form a seal with the female check valve. Tightening the coupling nut also forces both the male and female check valves off their poppet seats to open hydraulic ports and establish fluid flow through the coupler.

2 Claims, 5 Drawing Sheets

STRAIGHT CONNECTING HYDRAULIC QUICK COUPLER

TECHNICAL FIELD

This invention relates to hydraulic line couplers and, in particular, to a quick connect/disconnect hydraulic coupler for connecting rigid hydraulic members where no axial movement of the coupling halves can be achieved.

BACKGROUND OF THE INVENTION

Many different types of couplers have been used for connecting and disconnecting hydraulic lines and for preventing loss of hydraulic fluid upon disconnection. In most hydraulic systems, it is advantageous to provide these couplers at convenient locations for the rapid connection and disconnection of hydraulic lines.

Hydraulic couplers generally comprise a female connector on one hydraulic line and a male connector on a line to be connected. The connection of this type of coupler is accomplished simply by moving one or both of the coupling halves along the axis of the line so that the male connector "plugs into" the female connector.

The "plug-in" type of hydraulic coupler is very convenient to use and is satisfactory for many coupling situations. However, the axial movement necessary to complete the coupling action in presently available hydraulic couplers prevents their use with hard-line plumbing where no axial movement can be achieved. Hard-line connections may be required between two rigid hydraulic lines where flexible lines cannot be accommodated or between a fixed hydraulic component and a rigid hydraulic line. Thus, there exists a need for an hydraulic coupler which provides for rapid connection and disconnection of rigid hydraulic lines where no axial movement of the coupling halves can be achieved.

SUMMARY OF THE INVENTION

The present invention is a quick connect/disconnect hydraulic coupler designed to achieve all of the advantages of prior couplers plus the additional advantage of providing a quick connection between rigid hydraulic members where no axial movement of the connectors can be achieved. In addition, the coupler of the present invention is designed to be compact and lightweight as compared to presently available hydraulic couplers.

The hydraulic coupler of the present invention comprises a male connector attached to one hydraulic line and a female connector attached to another hydraulic line. The male and female coupler halves each include an annular check valve which is spring-biased against a poppet seat to prevent loss of hydraulic fluid when the coupler halves are disconnected. The male connector includes an annular coupling nut placed around the male check valve. The coupling nut has inside threads adapted to engage corresponding threads on the outside circumference of the female connector.

When the coupling halves are disconnected, the check valves are spring-biased against their poppet seats to prevent loss of fluid through hydraulic ports in each coupling half. The hydraulic pressure in each hydraulic line is applied through the ports to cavities formed by the check valves so as to apply additional pressure to force the check valves against the popper seats.

The two connectors of the hydraulic coupler must be aligned before they can be connected. However, aligning the connectors may be accomplished without axial movement of either of the coupling halves. When the connectors are aligned, the coupling nut can be moved axially and rotated to engage the threads on the female connector. As the coupling nut is tightened, the male check valve is forced against the female check valve to form a seal. As the coupling nut is tightened further, the nut forces both the male and female check valves off of their poppet seats to open the hydraulic ports and establish fluid flow through the hydraulic coupler.

BRIEF DESCRIPTION OF THE DRAWINGS

For a more complete understanding of the present invention and for further advantages thereof, reference is now made to the following Description of the Preferred Embodiments taken in conjunction with the accompanying Drawings, in which.

DESCRIPTION OF THE PREFERRED EMBODIMENTS

Figure 1:
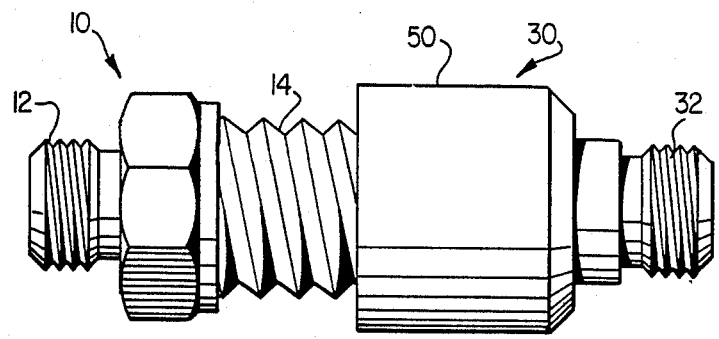
FIG. 1 is a plan view of the hydraulic coupler of the present invention showing the male and female connectors disconnected but aligned for connecting.
Figure 2:
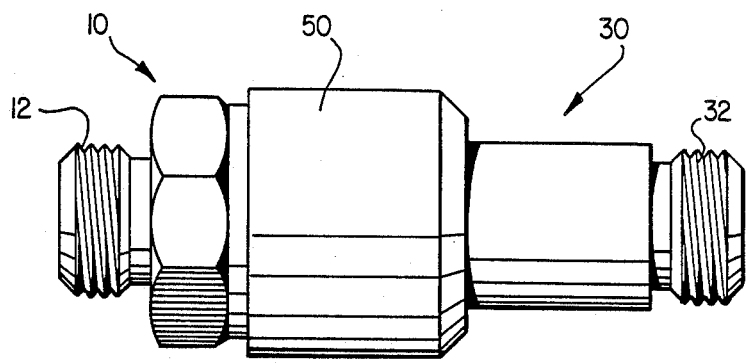
FIG. 2 is a plan view of a fully connected hydraulic coupler of the present invention.
Figure 3:
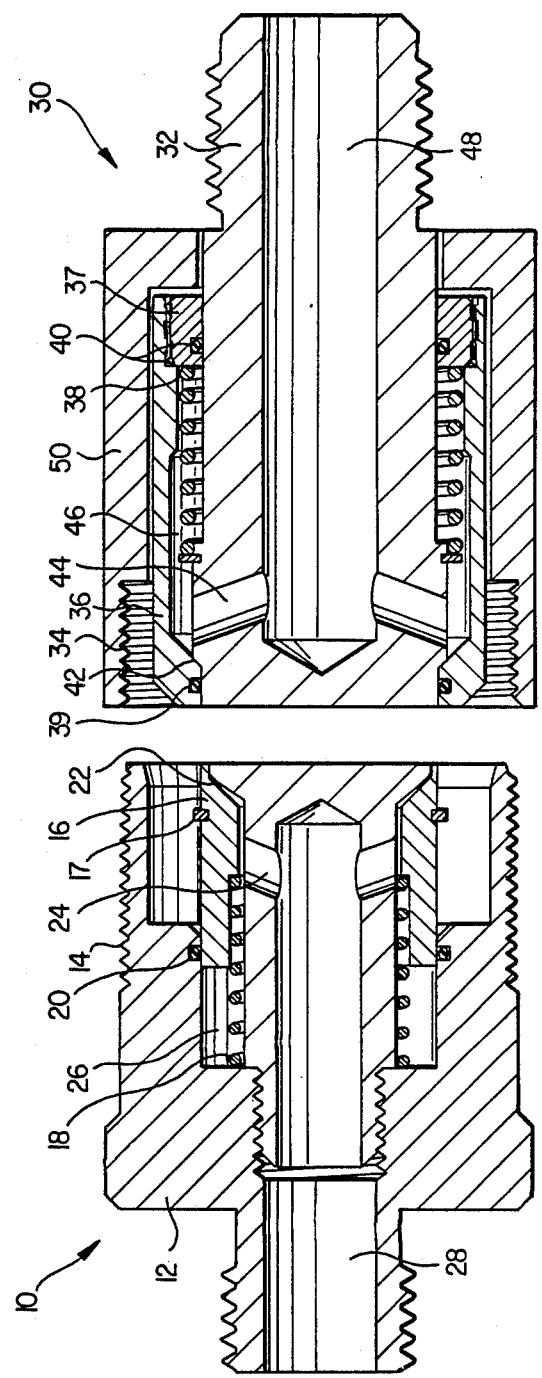
FIG. 3 is a longitudinal cross-sectional view of the disconnected male and female connectors of the hydraulic coupler of the present invention.
Figure 4:
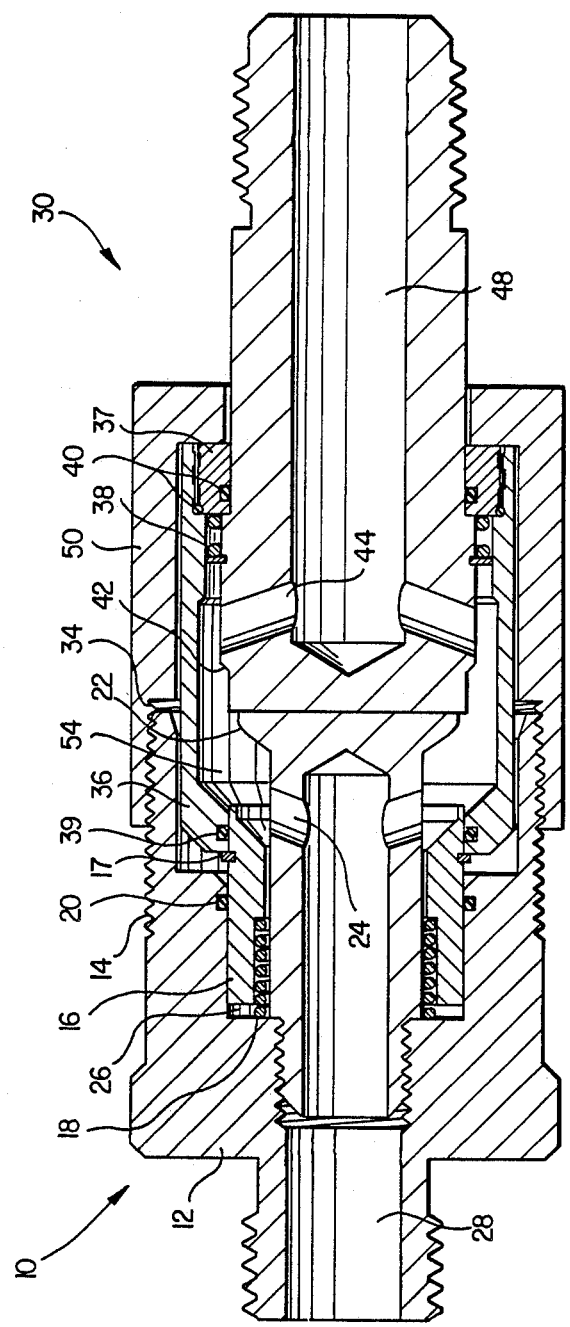
FIG. 4 is a longitudinal cross-sectional view of a connected hydraulic coupler of the present invention.

Referring to FIGS. 1, 2, 3, and 4, wherein like reference numerals refer to the same components in the FIGURES, FIGS. 1 and 3 illustrate the disconnected male and female connectors of the present invention and FIGS. 2 and 4 illustrate the fully connected hydraulic coupler of the present invention.

Referring to FIGS. 1 and 3, reference numeral 10 refers to the female connector and reference numeral 30 refers to the male connector of the present invention. The female connector 10 includes a base 12 which can be attached to a hydraulic line so that hydraulic fluid can flow through a bore 28. Likewise, the male connector 30 includes a base 32 which may be connected to another hydraulic line so that fluid can flow through a bore 48. A portion of the base 12 includes threads 14 around the outside circumference of the base 12. An annular check valve 16 is slidably disposed within the base 12. A biasing means, such as a coil spring 18, urges the check valve 16 against a poppet seat 22 to prevent the loss of hydraulic fluid when the connectors 10 and 30 are disconnected. Hydraulic fluid from the bore 28 flows through ports 24 into a cavity 26 to provide pressure to further urge the check valve 16 against the seat 22. An O-ring 20 provides a seal between the base 12 and the check valve 16 to prevent leakage of hydraulic fluid.

The male connector 30 includes an annular check valve 36 disposed around the base 32. The check valve 36 is connected to a retaining ring 37. The O-ring seals 39 and 40 prevent leakage of hydraulic fluid. A biasing means, such as a coil spring 38, urges the check valve 36 against a poppet seat 42 to prevent the loss of hydraulic fluid from the bore 48. Hydraulic fluid from the bore 48 passes through ports 44 into a cavity 46 to provide pressure to further urge the check valve 36 against the seat 42. An annular coupling nut 50 surrounds and contains the check valve 36 and the retaining ring 37, which are slidably disposed between the base 32 and the coupling nut 50. The coupling nut 50 includes threads 34 on a portion of its inside circumference. The threads 34 are adapted to engage the threads 14 of the female connector 10.

The hydraulic coupler of the present invention may be connected by aligning the female connector 10 with the male connector 30. The connectors 10 and 30 may be placed in physical contact with each other and aligned without the necessity for axial movement of either or both of the connectors 10 and 30.

The connectors 10 and 30 may be coupled together as shown in FIGS. 2 and 4. After the connectors 10 and 30 are in contact with each other and aligned, the coupling nut 50 can be moved axially toward the female connector 10 so that rotational movement of the coupling nut 50 engages the threads 34 with the threads 14. As the connectors 10 and 30 are being connected, the check valve 36 and the O-ring seal 39 are forced by the coupling nut 50 to unseat from the poppet seat 42 and to extend over the check valve 16 of the female connector 10. The O-ring 39 provides a seal between the check valve 16 and the check valve 36 to prevent the loss of fluid from the bore 48 and the ports 44. As the coupling nut 50 is tightened on the threads 14, the check valve 36 is urged against a flange 17 on the outer surface of the check valve 16, thereby forcing the check valve 16 to unseat from the poppet seat 22. When the connectors 10 and 30 are fully coupled, the check valves 16 and 36 are unseated and fluid communication is established between the bores 28 and 48 through the ports 24 and 44 and a channel 54 created by the coupling of the connectors 10 and 30.

The hydraulic coupler of the present invention may be disconnected simply by unthreading the coupling nut 50 in a reverse of the connecting procedure set forth above. The biasing springs 18 and 38 urge the check valves 16 and 36 back against their seats 22 and 42, respectively, to prevent loss of fluid when the hydraulic coupler is disconnected.

Figure 5:
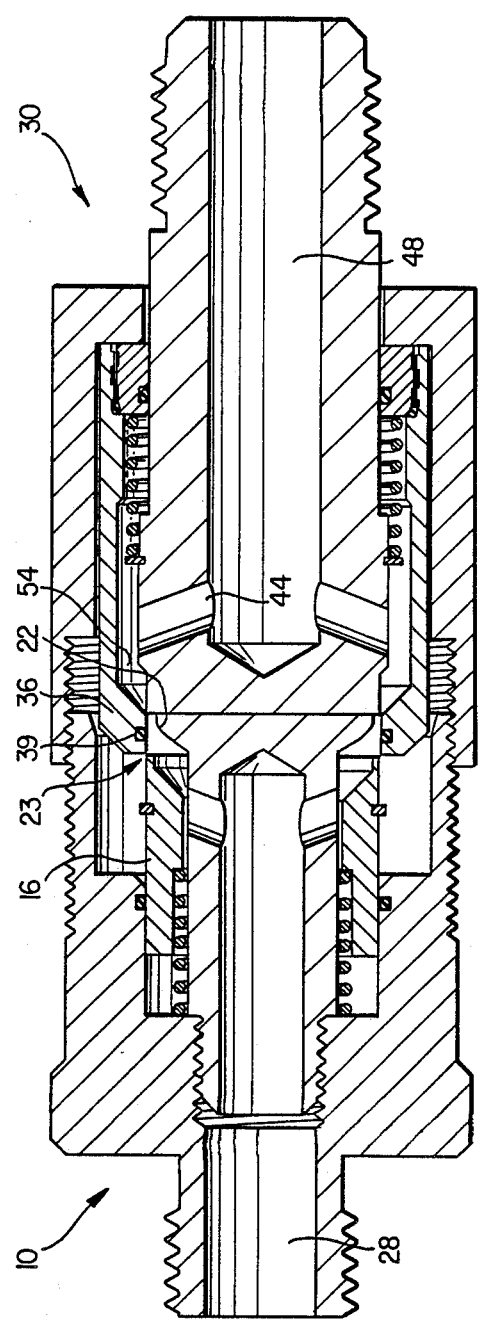
FIG. 5 is a longitudinal cross-sectional view illustrating a possible leakage path during connection of the hydraulic coupler of the present invention.

In the embodiment described in conjunction with FIGS. 3 and 4, it is possible for hydraulic fluid to escape during coupling when the bore 48 of the male connector 30 is pressurized and the bore 28 of the female connector 10 is unpressurized or at a relatively low pressure. In this situation, as illustrated in FIG. 5, it is possible during coupling for the higher pressure from the bore 48 to unseat the check valve 16 when the O-ring 39 just begins to seal against the check valve 16. If the check valve 16 is unseated from the poppet seat 22 by the higher pressure from the bore 48, the O-ring 39 can become unsealed from the check valve 16. This unsealed condition could allow pressurized hydraulic fluid to escape from the coupler through the leakage path 23.

Figure 6:
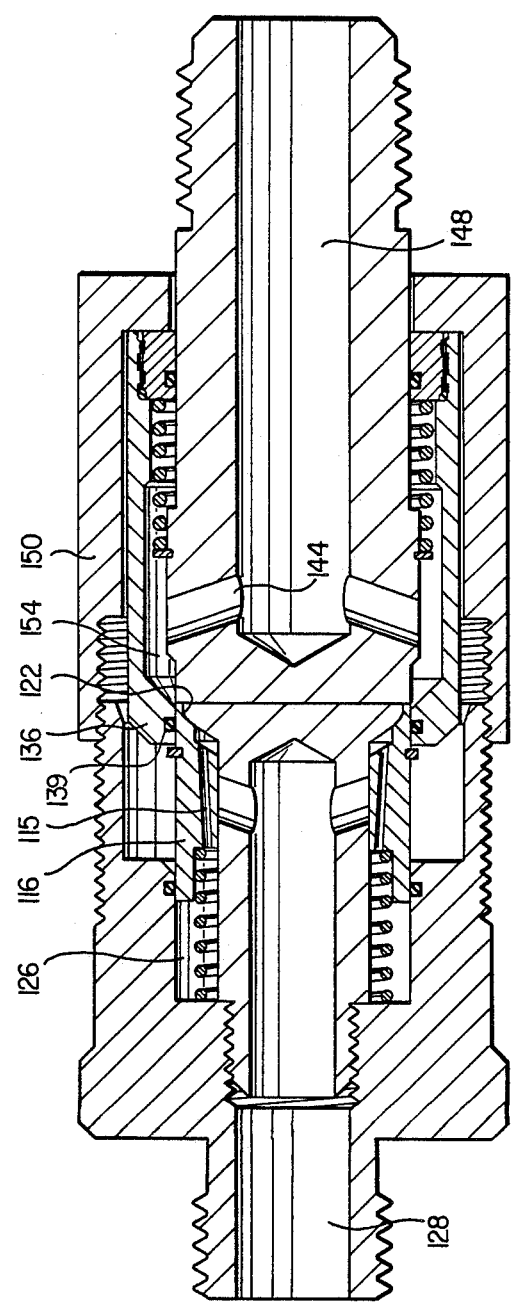
FIG. 6 is a longitudinal cross-sectional view of an alternate embodiment of the hydraulic coupler of the present invention.

In the modified coupler shown in FIG. 6, the check valve 116 includes at least one channel 115 providing fluid communication between the chamber 126 and the channel 154. During coupling of the modified coupler illustrated in FIG. 6, the coupling nut 150 forces the check valve 136 to extend over the check valve 116. If the higher pressure from the bore 158 unseats the check valve 116, pressurized fluid in the bore 148 passes through the port 144, through the channel 154, through the channel 115, and into the chamber 126. The additional fluid pressure in the chamber 126 causes the check valve 116 to reseat on the poppet seat 122, thereby allowing the O-ring 139 to maintain the seal against the check valve 116 and prevent any loss of hydraulic fluid during coupling. The remaining details of the coupling sequence of the modified coupler shown in FIG. 6 are substantially the same as those described above in conjunction with the embodiment shown in FIGS. 3 and 4.

Although the quick connect/disconnect hydraulic coupler of the present invention has been described with respect to specific embodiments thereof, various changes and modifications to the preferred embodiments may be suggested to those skilled in the art, and it is intended that the present invention encompass such changes and modifications as fall within the scope of the appended claims.

We claim:

1. An hydraulic coupler for quick connection and disconnection, comprising
    a female connector having a first axis, a first poppet seat, a first fluid port, and a first annular check valve, said first check valve slidably disposed within said female connector for translation along said first axis;
    a first means for biasing said first check valve against said first poppet seat to close said first fluid port;
    a male connector having a second axis, a second poppet seat, a second fluid port, and a second annular check valve, said second check valve slidably disposed around said male connector for translation along said second axis and having a means for forming a seal with said first check valve;
    a second means for biasing said second check valve against said second poppet seat to close said second fluid port; and
    an annular coupling nut slidably disposed around said second annular check valve for rotation about and translation along said second axis, said coupling nut adapted to align said axes, to engage said female connector, and to urge said second check valve into contact with said first check valve to form said seal, unseat said first and second check valves, and open said first and second fluid ports.

2. The hydraulic coupler of claim 1, wherein said coupling nut is further adapted to align said axes and engage said female connector without movement of said male and female connectors along said axes.

* * * * *